United States Patent [19]
Johnson

[11] Patent Number: 5,778,759
[45] Date of Patent: Jul. 14, 1998

[54] SELF-ALIGNING PISTON ROD

[75] Inventor: Jerry E. Johnson, Odessa, Tex.

[73] Assignee: Phoenix Energy Products, Incorporated, Houston, Tex.

[21] Appl. No.: 751,084

[22] Filed: Nov. 15, 1996

[51] Int. Cl.⁶ .................................................. F16J 1/10
[52] U.S. Cl. .......................... 92/129; 92/165 R; 92/87
[58] Field of Search ............................ 92/129, 165 R, 92/87

[56] References Cited

U.S. PATENT DOCUMENTS

| | | | |
|---|---|---|---|
| 254,129 | 2/1882 | Hanson . | |
| 534,813 | 2/1895 | Christensen . | |
| 1,725,337 | 8/1929 | Burkhard | 137/625.47 X |
| 1,774,219 | 8/1930 | Ackerman . | |
| 1,977,075 | 10/1934 | Magnuson | 309/4 |
| 3,720,140 | 3/1973 | Lee | 92/87 |
| 3,789,675 | 2/1974 | Kocher | 74/18.2 |
| 3,883,113 | 5/1975 | Kolb | 251/317 X |
| 3,923,428 | 12/1975 | Clark et al. | 92/87 X |
| 4,023,469 | 5/1977 | Miller | 92/86.5 |
| 4,157,057 | 6/1979 | Bailey | 92/87 |
| 4,160,626 | 7/1979 | Bell | 92/129 X |
| 4,262,880 | 4/1981 | Danko et al. | 251/317 X |
| 4,270,440 | 6/1981 | Lewis, II | 92/87 |
| 4,479,513 | 10/1984 | Koch et al. | 137/625.47 |
| 4,719,845 | 1/1988 | Dugan | 92/84 |
| 4,762,301 | 8/1988 | Wozniak et al. | 251/171 |
| 4,977,817 | 12/1990 | Doman | 92/31 |
| 5,085,129 | 2/1992 | Dugan | 92/129 X |
| 5,507,219 | 4/1996 | Stogner | 92/128 |

FOREIGN PATENT DOCUMENTS 26 32 476  1/1978  Germany .

*Primary Examiner*—Hoang Nguyen
*Attorney, Agent, or Firm*—Marshall, O'Toole, Gerstein, Murray & Borun

[57] ABSTRACT

A piston pump having structure to maintain substantially parallel alignment of a piston rod and a crosshead extension as a crosshead slide undergoes wear. The structure includes a slot defined by the end of the piston rod for receiving a male pilot of the crosshead extension. In a further embodiment, the piston rod has a male pilot and the end of the crosshead extension defines a slot for receiving the male pilot of the piston rod. The slot may be oblong in a direction transverse to the longitudinal axis of the piston rod. The structure may additionally or alternatively include a centering sleeve attached to the outer surface of the piston rod adjacent to and coaxial with the piston. A backflushing system may be used with the sleeve to keep the piston, piston sleeve, and pump cylinder cool. One such system has a conduit connected to the sleeve and in liquid communication with an annular cavity between the sleeve and the pump cylinder to circulate coolant therethrough.

19 Claims, 7 Drawing Sheets

SELF-ALIGNING PISTON ROD

The present invention relates generally to piston rods and, more particularly, to a reciprocating piston pump having structure for correcting misalignment of the piston rod and a crosshead extension connected thereto.

BACKGROUND OF THE INVENTION

In many reciprocating piston pumps, a motor-driven crosshead reciprocates a horizontal crosshead slide and a crosshead extension to drive a piston rod and a piston in a cylinder to pump fluid through the cylinder. In conventional piston pumps, the piston rod and crosshead extension are joined together end-to-end and have a male pilot of the crosshead extension that fits tightly into a recess in the piston shaft. This coupling restrains the crosshead extension from translational transverse movement with respect to the piston rod. A clamp releasably couples the crosshead extension to the piston rod and prevents the male pilot from disengaging the recess, as illustrated in FIGS. 1 and 2.

As the crosshead slide wears, the crosshead extension and piston rod can become angularly misaligned. A misaligned conventional piston pump is shown in FIG. 1 and is apparent because the centerline or longitudinal axis of the piston rod is no longer parallel to the longitudinal axis of the crosshead extension. Such misalignment accelerates wear of the pump cylinder and cylinder liner. Misalignment also causes high stresses in the clamped components which can result in a fractured piston rod or crosshead extension.

Some pumps accommodate misalignment by using fluid or other materials sealed in a chamber in the end of the crosshead extension connected to the piston rod. The chamber receives a male end of the piston rod and permits movement of the end of the piston rod during each cycle. Such adjustments of the piston rod do not maintain parallel alignment of the piston rod and crosshead extension and are ineffective in reducing wear of the piston and the cylinder liner.

Further, accommodating but not correcting piston rod misalignment causes the piston to become misaligned with the cylinder. Misalignment of the piston in the cylinder adversely affects pump efficiency.

Conventional piston pumps also typically have a backflush system to keep the liner bore cool and to wash out any small solids that pass the piston seal. Conventional backflush systems are inefficient because they direct water indiscriminately to the cylinder bore and piston and not specifically to the components that need to be cooled the most.

Thus, it is desirable to have a piston rod-to-crosshead extension connection that corrects misalignment of the piston rod and crosshead extension, maintains alignment between the piston and cylinder bore, and cools the piston efficiently.

SUMMARY OF THE INVENTION

In accordance with the present invention, there is provided an improved piston rod-to-crosshead extension connection that corrects misalignment and maintains the rod axes parallel to one another. One embodiment of the invention includes a pump piston rod for a pump having a crosshead extension with a male pilot at one of its ends and a longitudinal axis. The pump piston rod includes a first end adapted to be fixed to a piston and a second end adapted to be clamped to the crosshead extension, wherein the second end of the piston rod defines a slot oblong in a direction transverse to the longitudinal axis of the crosshead extension for slidably receiving the male pilot of the crosshead extension.

Another embodiment comprises a crosshead extension for a piston pump including a piston rod having first and second ends, a longitudinal axis extending between the ends, and a male pilot extending longitudinally outward from the first end. The crosshead extension has a first end adapted to be attached to a crosshead and a second end adapted to be clamped to the first end of the piston rod, wherein the second end of the crosshead extension defines a slot oblong in a direction transverse to the longitudinal axis of the piston rod for slidably receiving the male pilot of the piston rod.

Another embodiment of the present invention is a piston pump comprising: a piston rod having a first end attached to a piston and a second end defining a slot that is oblong in a direction transverse to the longitudinal axis of the piston rod; a crosshead extension having an outwardly extending male pilot disposed in the piston rod slot; and a clamp connecting the piston rod to the crosshead extension.

In a further embodiment, the piston pump may also comprise a subrod or intermediate rod coupling the crosshead extension to the second end of the piston rod, wherein the second end of the piston rod defines an oblong slot and receives a male pilot extending outwardly from the subrod. The subrod may alternatively have an end defining an oblong slot coupled to a male pilot extending from the second end of the piston rod.

The piston pump may contain a centering sleeve fixed to the piston rod adjacent to and coaxial with the piston. The centering sleeve may have a taper for reducing the weight of the centering sleeve and for increasing the strength of the sleeve. The centering sleeve may also include means for backflushing the piston. The means for backflushing may include a conduit in fluid communication with the centering sleeve and a gap between an outer surface of the centering sleeve and the cylinder.

Another alternative piston pump includes: a piston rod having a first end attached to a piston and having a second end having an outwardly extending male pilot; a crosshead extension having a longitudinal axis and a first end defining a slot that is oblong in a direction transverse to the longitudinal axis of the crosshead extension for slidably receiving the male pilot of the piston rod; and a clamp connecting the piston rod to the crosshead extension.

The features summarized above in connection with a piston pump having an oblong slot located in the piston rod are also applicable to the piston pump having an oblong slot located in the crosshead extension. Thus, when a piston pump is used with a slotted crosshead extension, the pump may also include a centering sleeve and structure for backflushing. Further, when a piston pump has a subrod, the piston pump may also include a centering sleeve and structure for backflushing.

DETAILED DESCRIPTION OF THE DRAWINGS

Figure 1:
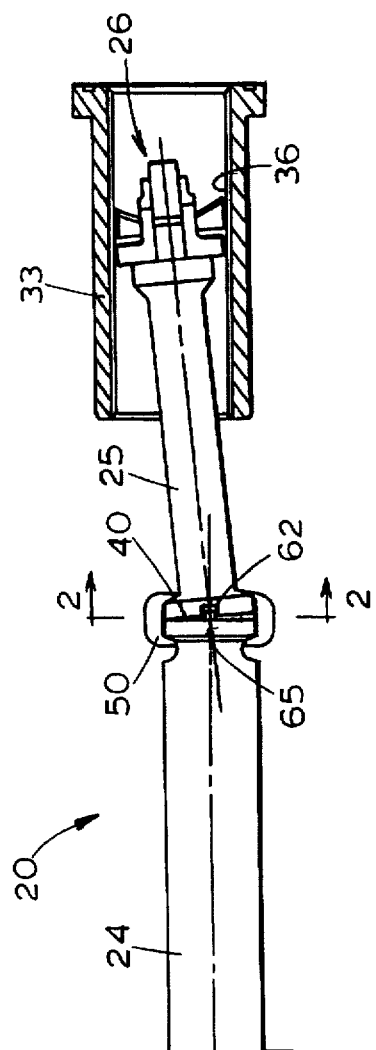
FIG. 1 is a sectional view of a conventional piston pump in a misaligned state.
Figure 2:
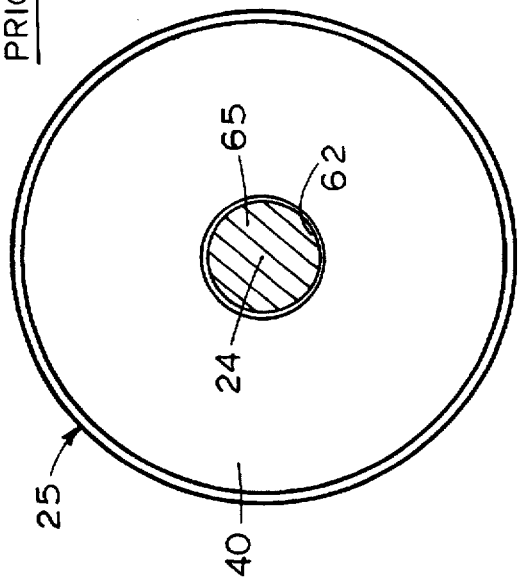
FIG. 2 is a cross-section of a crosshead extension-to-piston rod connection taken along line 2—2 in FIG. 1.

To the extent practical, the same reference numerals will be used to identify the same element in each of the figures. A prior art piston pump 20 is shown in FIGS. 1 and 2 and includes a motor-driven crosshead 21 which is guided by a crosshead slide 22 and drives a crosshead extension 24. The crosshead extension 24 is joined to and reciprocates with a piston rod 25 and a piston 26. The piston 26 is disposed in a cylinder 33 and, as the piston 26 reciprocates, fluid is pumped through the cylinder 33.

In the conventional piston pump 20, the piston rod 25 and the crosshead extension 24 are coupled end-to-end by a clamp 50. To maintain axial alignment of the piston rod 25 and crosshead extension 24, a male pilot 65 is fitted into a mating recess 62. As seen in FIG. 1, after wear has occurred at a bottom side 81 of the crosshead slide 22, the crosshead 21 shifts downward and the crosshead extension 24 shifts downward as well. Being tightly engaged in the slot 62, the male pilot 65 pulls the slot 62 and the piston rod 25 in a direction transverse to the longitudinal axis as the crosshead extension 24 shifts lower. In turn, the piston 26 tilts as the piston rod 25 moves, resulting in the piston 26 no longer being coaxial with the cylinder 33. Inefficiency and premature wear of the piston 26 occur when the piston 26 is not coaxial with the cylinder 33. Further, the cylinder 33 includes a lining 36 that is preferably made of an abrasion resistant material. The lining 36 is also subject to localized premature wear when the piston 26 is skewed in the cylinder 33.

Figure 3:
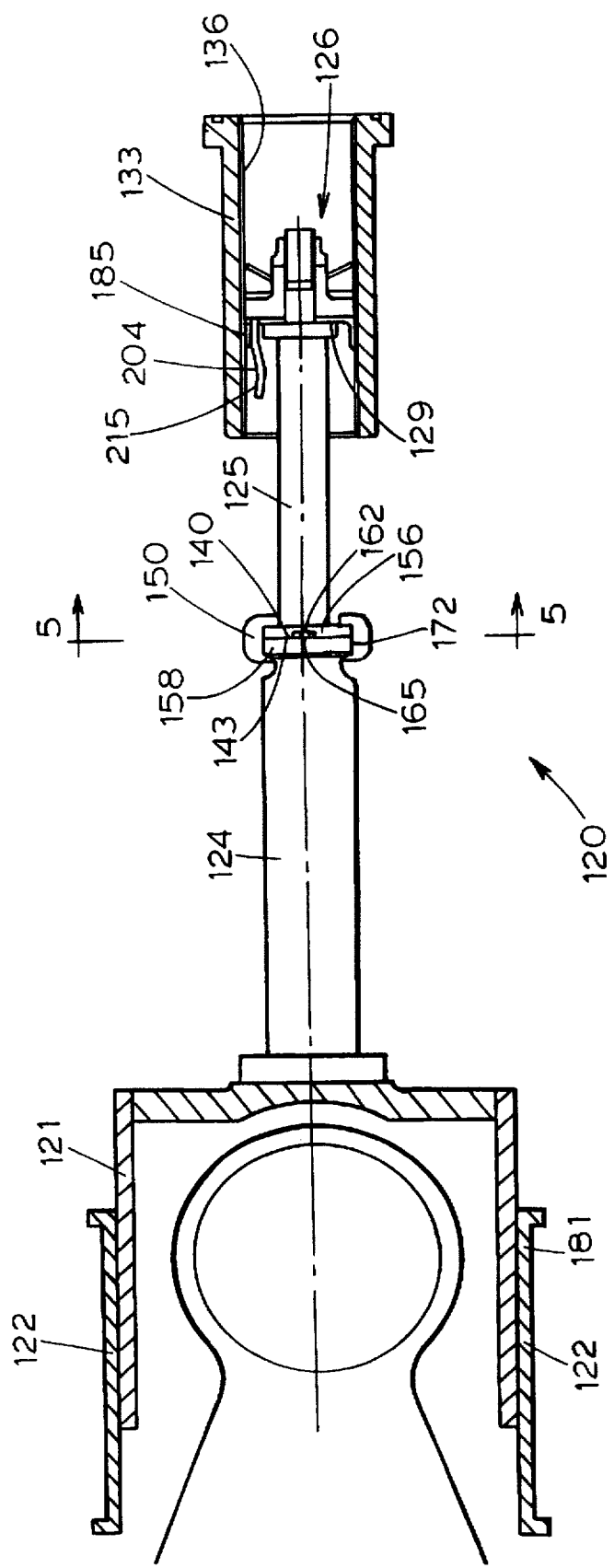
FIG. 3 is a cross-sectional view of a piston pump in accordance with the present invention.

A piston pump according to the present invention is shown in FIG. 3 and is designated generally at 120 and, similar to the piston pump 20, includes a crosshead 121, a crosshead slide 122, a crosshead extension 124, and a piston rod 125. The crosshead extension 124 is bolted or otherwise suitably fixed to the crosshead 121 which is attached to a pump gear end (not shown) coupled to a rotating driving source (not shown) such as a gas engine, electric motor or belt drive. The crosshead 121 is slidably engaged in the crosshead slide 122 which keeps the crosshead extension 124 roughly parallel to the ground.

A piston 126 is attached to a first end 129 of the piston rod 125 by any suitable means such as a flange 130 (FIG. 9) and a nut 132 (FIG. 9), the piston 126 being secured between the flange 130 of the rod 125 and the nut 132. The piston 126 is slidably disposed in a cylinder 133 having a liner 136 composed of metal, ceramic, or any other suitable material.

Figure 4:
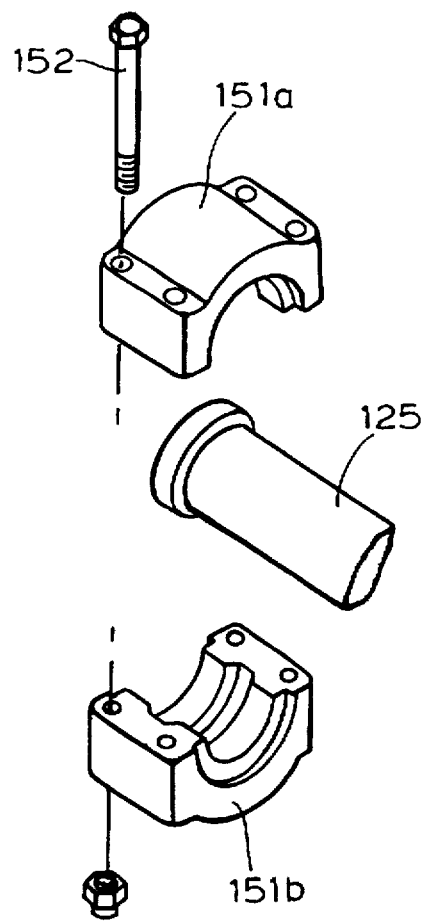
FIG. 4 is an exploded view of a clamp for coupling a piston rod to a crosshead extension.

A second end 140 of the piston rod 125 is coupled to a first end 143 of the crosshead extension 124 by a clamp 150 which engages a piston rod flange 156 on the piston rod 125 and a crosshead extension flange 158 on the crosshead extension 124. The clamp 150 may be any suitable clamp, such as the conventional clamp shown in FIG. 4 which comprises halves 151a, 151b and bolts 152 for securing the halves 151a, 151b together. Alternatively, hinged clamps 150, illustrated in FIGS. 6–8, having hinges 153 and bolts 154 can be used.

Figure 6A:
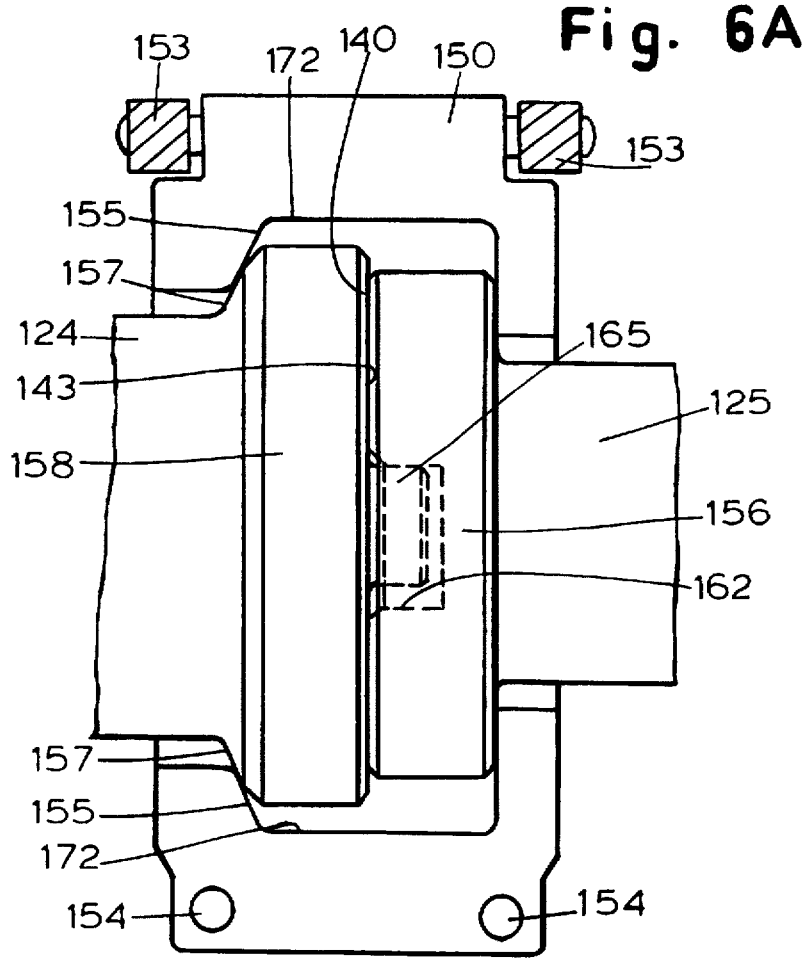
FIG. 6A is an enlarged view of the ends of the piston rod and the crosshead extension shown in FIG. 3.
Figure 6B:
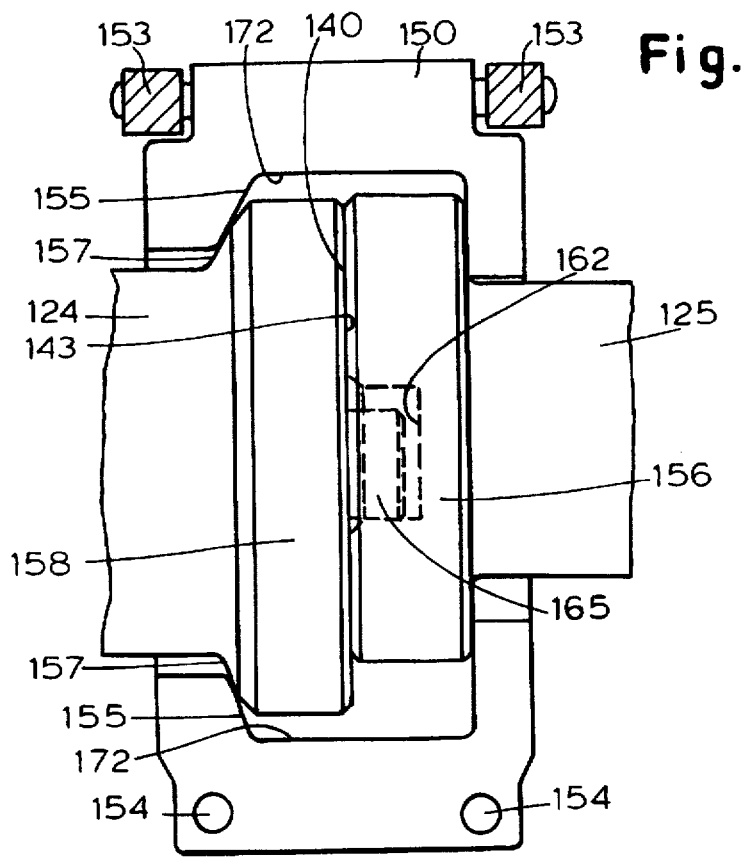
FIG. 6B is an elevational view of the coupling of FIG. 6A after the piston pump has undergone some wear and the male pilot has moved to the bottom of a slot in the piston rod.
Figure 7:
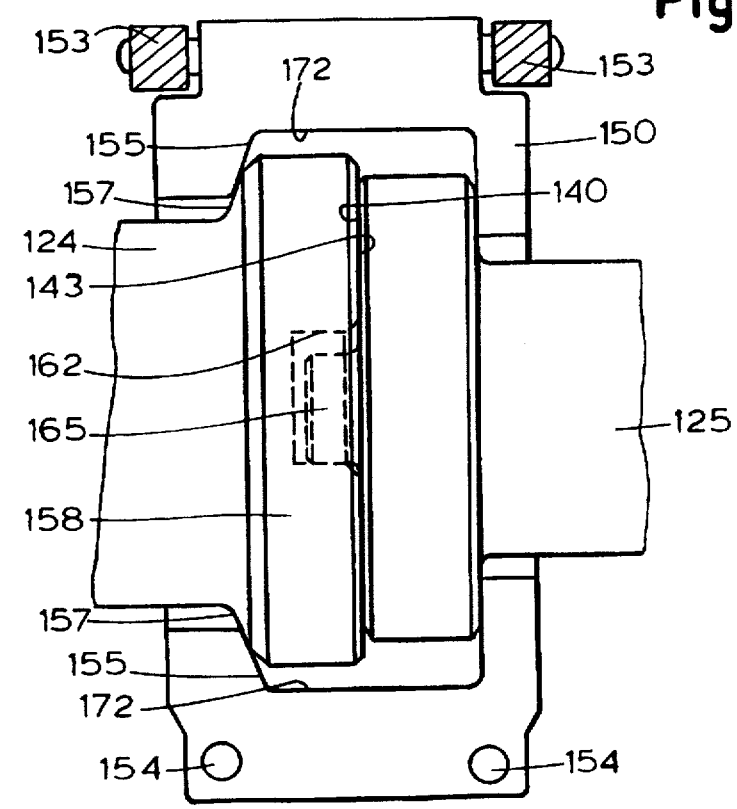
FIG. 7 is an elevational view of an alternative embodiment in which the piston rod has a male pilot and the crosshead extension has a slot.
Figure 8:
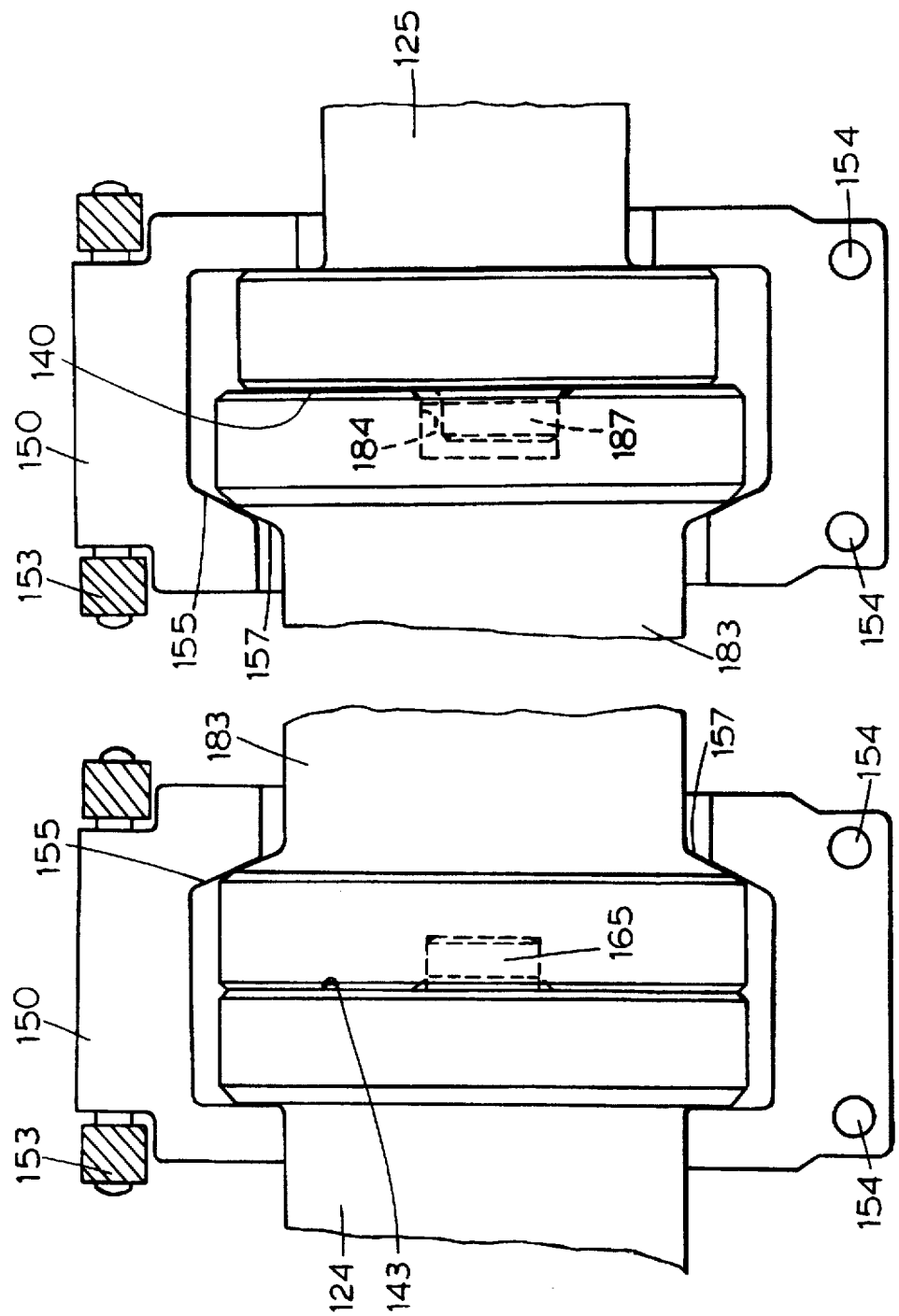
FIG. 8 is an elevational view of an alternative embodiment having a subrod with an oblong slot receiving a male pilot of a piston rod.

As seen in FIGS. 6–8, the clamp 150 may have tapers or bevels 155 to urge the piston rod 125 toward the crosshead extension 124 when clamped. Either the crosshead extension flange 158 or the piston rod flange 156 may have a bevel 157 which is adjacent to the tapers 155 of the clamp 150 when the crosshead extension 124 and the piston rod 125 are clamped together. Only one of the flanges 156, 158 has a bevel 157, because this will allow the clamp 150 to bear firmly on one flange while urging the remaining flange into secure engagement. The bevel 157 is preferably less than 45° from the vertical and more preferably 22°–25° from the vertical.

Figure 5:
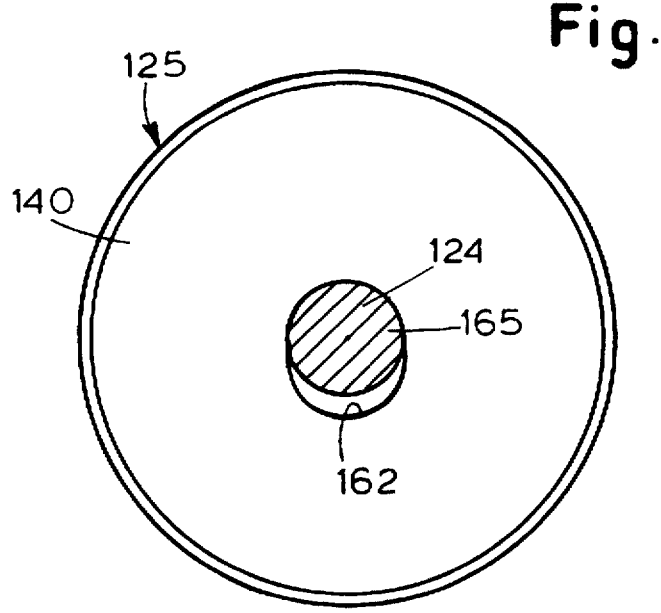
FIG. 5 is a cross-sectional view of the piston rod-to-crosshead extension connection taken along line 5—5 in FIG. 3.

As best seen in FIGS. 5, 6A, and 6B, the second end 140 of the piston rod 125 defines a slot 162 for receiving a male pilot 165 of the crosshead extension 124. The piston pumps 120 in FIGS. 5 and 6A are unworn or new whereas the piston pump shown in FIG. 6B is worn. The slot 162 preferably extends above the centerline of the piston rod 125 a distance equal to the radius of the male pilot 165, but extends below the centerline of the piston rod 125 further than the radius of the male pilot 165, as seen in FIGS. 5 and 6A. The lower portion of the slot 162 leaves space for the male pilot 165 to slide downwardly in a direction perpendicular to the longitudinal axis of the crosshead extension 124, thereby maintaining the piston rod 125 and the crosshead extension 124 substantially horizontal and parallel to each other, as will be discussed in more detail below. The slot 162 preferably extends below the centerline of the piston rod 125 by a distance of about 3/16" plus the radius of the male pilot 165 (i.e., the length of the slot 162 is about 3/16" plus the diameter of the male pilot 165).

The depth of the slot 162, that is, the dimension of the slot 162 parallel to the longitudinal axis of the piston rod 125, is at least the distance that the male pilot 165 extends from the first end 143 of the crosshead extension 124 but preferably slightly deeper to accommodate any dirt or oil that may interfere with a proper fit. The width of the slot 162 is preferably approximately the diameter of the male pilot 165 to prevent lateral translation of the piston rod 125 with respect to the crosshead extension 124.

An annular gap 172 (FIGS. 6A, 6B, and 7) is defined between the clamp 150 and the crosshead extension flange 158 and the piston rod flange 156. The annular gap 172 is preferably at least 1/16" between the lower portion of the clamp 150 and the lower portion of the crosshead extension 124 in an unworn pump 120 to accommodate the flange 158 of the crosshead extension 124. The annular gap 172 is preferably 3/16" between the inner diameter of the clamp 150 and the flange 156. Although the gap 172 may be larger than 1/16", relatively close-fitting clamps 150 are preferred so that the clamp 150 does not interfere with the operation of the pump 120. The diameter of the flange 156 of the piston rod 125 can be reduced if necessary to provide the gap 172 between the flange 156 and the clamp 150 for the clamp 150 to lower relative to the piston rod 125.

During operation, some piston pump 120 parts undergo wear. In particular, a bottom portion 181 (FIG. 3) of the crosshead slide 122 (FIG. 3) becomes worn which causes the longitudinal axis of the crosshead extension 124 to shift downward as depicted for the crosshead slide 22 in the prior art pump 20 in FIG. 1. To compensate for this dimensional change, the male pilot 165 of the crosshead extension 124 shifts downward within the slot 162 from the position shown in FIG. 6A toward the bottom of the slot 162. The male pilot 165 is depicted at the bottom of the slot 162 in FIG. 6B. The male pilot 165 of the crosshead extension 124 slides downward in the slot 162 when the clamp 150 is removed during maintenance, such as at the same time that the piston 126 is replaced, or at any other time desired. The amount that the crosshead extension 124 slides is determined by the amount that the crosshead slide 122 has worn.

The flange 158 depicted in FIGS. 6A and 6B is beveled. If, instead, the flange 156 were beveled, then the clamp 150 would remain coaxial with the flange 156 during operation whereas the flange 158 of the crosshead extension 124 would lower relative to the clamp 150.

Because the slot 162 is oblong in a transverse direction, the piston rod 125 does not move transverse to the longitudinal axis of the piston rod 125 while the crosshead extension 124 moves downwardly. Thus, substantially parallel alignment between the longitudinal axis of the piston rod 125 and the longitudinal axis of the crosshead extension 124 is maintained as the crosshead 121 (FIG. 3) lowers from wear. Even if further wear causes some misalignment, the angle between the longitudinal axis of the piston rod 125 and the crosshead extension 124 will not be as severe as in the prior art pumps. By maintaining alignment or reducing misalignment, wear, particularly in the cylinder liner 136 (FIG. 3), can be reduced and overall piston pump 120 efficiency can be increased. Also, stresses in the area of the clamp 150 can be reduced, increasing the life of the clamp 150, piston rod 125, and the crosshead extension 124.

The slot 162 has until now been described as being located in the piston rod 125, but the slot 162 may instead be defined in the end portion of the crosshead extension 124. In that case, as illustrated in FIG. 7, the second end 140 of the piston rod 125 has a male pilot 165 disposed in a slot 162 defined by the crosshead extension 124. Such a slot 162 extends above the longitudinal axis of the crosshead extension 124. Thus, in such an embodiment, the slot 162 slides past the male pilot 165 as the crosshead extension 124 lowers from wear of the crosshead slide 122. Preferably, the slot 162 of an unworn pump 120 extends above the longitudinal axis of the crosshead extension 124 by about ⅗/16" plus the radius of the male pilot 165 to account for the amount that the crosshead extension 124 will lower from wear of the crosshead slide 122.

Although the second end 140 of the piston rod 125 is shown attached to a crosshead extension 124 in FIGS. 1–3 and 5–7, the second end 140 of the piston rod 125 may instead be attached to other coupling structures such as an intermediate rod or a subrod. Thus, the discussion above is equally applicable to structures other than the crosshead extension 124. For example, an intermediate rod or subrod 183 may have a male extension similar to the male pilot 165 of the crosshead extension 124 discussed above in connection with FIGS. 3–6B and disposed in the slot 162 in the piston rod 125. Alternatively, as seen in FIG. 8, the subrod 183 may have an oblong slot 184 similar to the slot 162 for receiving a male extension 187 of the piston rod 125. The other end of the subrod 183 is coupled by a clamp to the crosshead extension 124 and includes a slot to accommodate the male pilot 165. The end of the subrod 183 coupled to the crosshead extension 124 may have an oblong slot similar to the slot 162 or, alternatively, the end of the crosshead extension 124 coupled to the subrod 183 may have an oblong slot similar to the slot 162.

As seen in FIG. 8, one clamp 150 may be used to couple the subrod 183 to the crosshead extension 124, and a second clamp 150 may be used to couple the subrod 183 to the piston rod 125. The ends of the subrod 183 may have tapers 157. However, if an end of the subrod 183 has a taper 157, that end of the subrod 183 must be clamped to either a flange 156 or flange 158 that is not tapered.

Figure 9:
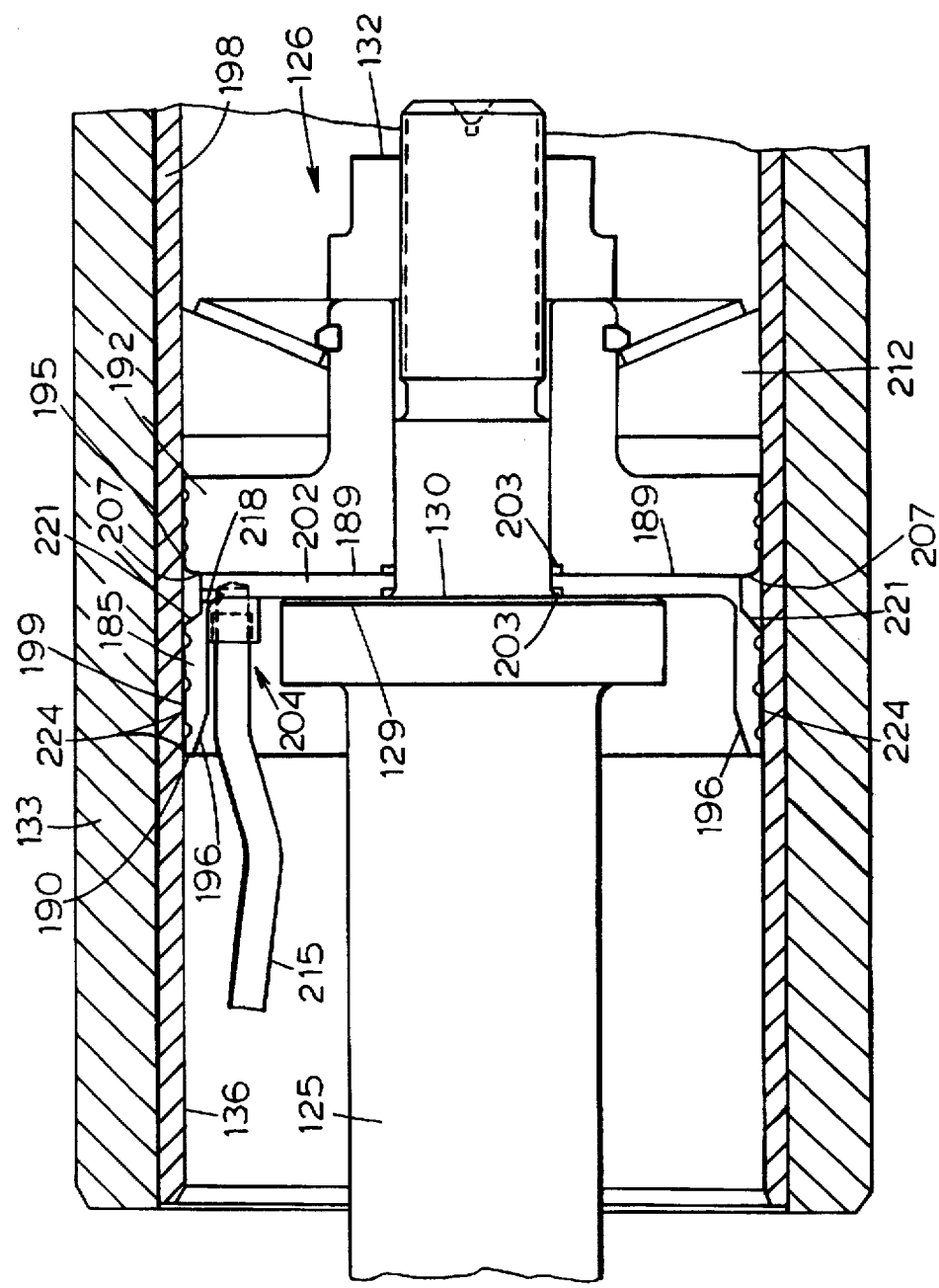
FIG. 9 is a sectional view of a centering sleeve and a backflushing system in accordance with the present invention.

As illustrated in FIG. 9, the piston 126 is provided with a centering sleeve 185 that is bolted on the piston rod 125 by the piston nut 132. The centering sleeve 185 is coaxial with and adjacent to the piston 126. The sleeve 185 has a first end 189 adjacent to the piston 126 and a second end 190 distal from the piston 126. Because the piston rod 125 and the piston 126 are fixed to one another, the centering sleeve 185 maintains the piston rod 125 coaxial with the longitudinal axis of the cylinder 133 during installation of the piston 126 into the cylinder 133. A metal hub 192 of the piston 126 does not have enough width by itself to keep the piston rod 125 parallel to the longitudinal axis of the cylinder 133 because an annular space 195 between the metal hub 192 outer diameter and the cylinder liner or inner diameter 136 allows some tilting of the relatively short hub 192. As the hub 192 tilts, wear of the liner 136 accelerates and the degree of tilt worsens. This is compounded by the torque applied by the weight of the piston rod 125 extending to one side (left in the Figures) of the piston 126.

The centering sleeve 185 may be composed of metal, hard plastic, or other suitable material. The centering sleeve 185 may be of uniform thickness or may have a taper 196 for increasing strength and decreasing weight of the sleeve 185. Depending upon sleeve 185 geometry, the taper 196 may also improve heat transfer and facilitate manufacture. For example, the centering sleeve 185 may have a 10°–15° taper extending from a location between the first end 189 and second end 190 of the sleeve 185 toward the second end 190 of the sleeve 185. Thus, as shown in FIG. 9, the first end 189 of the sleeve 185 may be wider radially than the second end 190 of the sleeve 185. An outer surface 199 of the sleeve 185 is adjacent to the liner 136. A top annular portion 202 of the centering sleeve 185 is adjacent to the metal hub 192. 0-rings 203 are disposed adjacent the flange 130 of the piston rod 125 and between the sleeve 185 and the metal hub 192. The outer diameter of the sleeve 185 has a very tight tolerance so that the outer surface 199 is an effective distance from the cylinder liner 136. Also, the inner diameter of the sleeve 185 has a very tight tolerance so that the first end 129 of the piston rod 125 received therein fits properly.

The centering sleeve 185 tends to maintain the piston rod 125 parallel to the cylinder 133 axis, but the centering sleeve 185 is not required to obtain the advantages of the piston rod-to-crosshead extension coupling described above. Without the sleeve 185 on the piston rod 125, the slot 162 can still maintain alignment of the crosshead extension 124 and piston rod 125. Conversely, the sleeve 185 can be used on pumps lacking the piston rod-to-crosshead extension coupling described above. In such a case, the centering sleeve 185 helps maintain the piston rod 125 parallel to the longitudinal axis of the cylinder 133 to reduce wear on the cylinder liner 136.

A backflush system 204 (FIG. 9) may be included in the piston pump 120 according to the present invention to provide a continuous flow of water directed to a back side 207 of the piston 126 for cooling the piston 126 and cylinder liner 136 and for washing out any small solids that pass a piston seal 212. The backflush system 204 and the centering sleeve 185 also provide a bearing effect between the centering sleeve 185 and the liner 136. The piston seal 212 may be made of any suitable material including a rubber-faced fabric. The backflush system 204 of the present invention comprises a hose 215 or other conduit connected to the centering sleeve 185. The centering sleeve 185 has a bore 218 located where the hose 215 is connected for passing water through the sleeve 185. This connection directs water to areas that are most critical, such as the side of the piston hub 192 facing the sleeve 185, the outer diameter of the piston hub 192 and the area between the piston seal 212 and the cylinder liner 136. Thus, the backflushing system 204 reduces the amount of water needed to cool the piston 126.

At the first end 189 of the centering sleeve 185, adjacent the outer surface 199, an annular gap 221 is defined between the back side 207 of the piston 126 and the centering sleeve 185. Water from the hose 215 eventually comes out in an annular cavity 224 defined between the centering sleeve 185 and the liner 136. When the cylinder 133 wears, the annular cavity 224 increases in size. The expansion of the annular cavity 224 causes the backflushing water to lose some of its bearing effect between the centering sleeve 185 and the liner 136. The water, however, remains more useful as a coolant in this system than in conventional cooling systems because, as stated earlier, the water is directed to critical areas.

The foregoing detailed description has been given for clearness of understanding only, and no unnecessary limitations should be understood therefrom, as modifications will be obvious to those skilled in the art.

What is claimed is:

1. A pump piston rod for connection to a crosshead extension and a piston in a pump, the piston rod comprising:
   a first end adapted to be fixed to the piston, a second end adapted to be clamped to the crosshead extension, and an elongate body having a longitudinal axis; and
   the second end of the piston rod defines a slot oblong in a cross-section transverse to the longitudinal axis of the piston rod body, the oblong slot for slidably receiving a male pilot of the crosshead extension.

2. A crosshead extension for connection to a piston rod and a crosshead in a pump, the crosshead extension comprising:
   a first end adapted to be attached to the crosshead, a second end adapted to be clamped to the piston rod, and an elongate body having a longitudinal axis; and
   the second end of the crosshead extension defines a slot oblong in a cross-section transverse to the longitudinal axis of the crosshead extension body, the oblong slot for slidably receiving a male pilot of the piston rod.

3. A subrod for connection to a piston rod and a crosshead extension in a pump, the subrod comprising:
   a first end adapted to be coupled to the crosshead extension, a second end adapted to be clamped to the piston rod, and an elongate body having a longitudinal axis; and
   the second end defines a slot oblong in a cross-section transverse to the longitudinal axis of the subrod body, the oblong slot for slidably receiving a male pilot of the piston rod.

4. A piston pump comprising:
   a piston;
   a piston rod having an elongate body defining a longitudinal axis, a first end attached to the piston, and a second end defining a slot that is oblong in a cross-section transverse to the longitudinal axis of the piston rod body;
   a crosshead extension having an outwardly extending male pilot disposed in the piston rod slot; and
   a clamp releasably engaging the piston rod to the crosshead extension.

5. The piston pump of claim 4 and further comprising a centering sleeve fixed to the piston rod adjacent to and coaxial with the piston.

6. The piston pump of claim 5 wherein the centering sleeve comprises means for backflushing the piston.

7. The piston pump of claim 6 wherein the means for backflushing includes a conduit connected to the centering sleeve and in liquid communication with a gap between an outer surface of the centering sleeve and the piston.

8. A piston pump comprising:
   a piston;
   a piston rod having a first end attached to the piston and a second end having an outwardly extending male pilot;
   a crosshead extension having an elongate body defining a longitudinal axis, and a first end defining a slot that is oblong in a cross-section transverse to the longitudinal axis of the crosshead extension body, the slot for slidably receiving the male pilot of the piston rod; and
   a clamp releasably engaging the piston rod to the crosshead extension.

9. The piston pump of claim 8 further comprising a centering sleeve fixed to the piston rod adjacent to and coaxial with the piston.

10. The piston pump of claim 9 wherein the centering sleeve has means for backflushing the piston.

11. The piston pump of claim 10 wherein the means for backflushing includes a conduit connected to the centering sleeve and in liquid communication with a gap between an outer surface of the centering sleeve and the piston.

12. A piston pump having a crosshead and a crosshead slide for driving a piston, the pump further comprising:
   a piston rod having an elongate body defining a longitudinal axis, a first end attached to the piston, and a second end defining a slot that is oblong in a cross-section transverse to the longitudinal axis of the piston rod body;
   a subrod having a first end and a second end, wherein the first end includes an outwardly extending male pilot disposed in the piston rod slot;
   a clamp releasably engaging the piston rod to the subrod; and
   a crosshead extension coupled to the second end of the subrod.

13. The piston pump of claim 12 and further comprising a centering sleeve fixed to the piston rod adjacent to and coaxial with the piston.

14. The piston pump of claim 13 wherein the centering sleeve comprises means for backflushing the piston.

15. The piston pump of claim 14 wherein the means for backflushing includes a conduit connected to the centering sleeve and in liquid communication with a gap between an outer surface of the centering sleeve and the piston.

16. A piston pump having a crosshead and crosshead slide for driving a piston, the pump comprising:
   a piston rod having a first end attached to the piston, and a second end having an outwardly extending male pilot;
   a subrod having an elongate body defining a longitudinal axis and an end defining a slot that is oblong in a cross-section transverse to the longitudinal axis of the subrod body, the slot receiving the piston rod male pilot;
   a clamp releasably engaging the piston rod to the subrod; and a crosshead extension coupled to the subrod.

17. The piston pump of claim 16 and further comprising a centering sleeve fixed to the piston rod adjacent to and coaxial with the piston.

18. The piston pump of claim 17 wherein the centering sleeve comprises means for backflushing the piston.

19. The piston pump of claim 18 wherein the means for backflushing includes a conduit connected to the centering sleeve and in liquid communication with a gap between an outer surface of the centering sleeve and the piston.

* * * * *